(12) United States Patent
Ota

(10) Patent No.: US 11,202,525 B2
(45) Date of Patent: Dec. 21, 2021

(54) HOOK OF LUGGAGE HANGER

(71) Applicant: VIE INTERNATIONAL GROUP CO., LTD, Kyoto (JP)

(72) Inventor: Kinya Ota, Kyoto (JP)

(73) Assignee: VIE INTERNATIONAL. GROUP CO., LTD., Kyoto (JP)

( * ) Notice: Subject to any disclaimer, the term of this patent is extended or adjusted under 35 U.S.C. 154(b) by 0 days.

(21) Appl. No.: 16/973,155

(22) PCT Filed: Jul. 3, 2019

(86) PCT No.: PCT/JP2019/026479
§ 371 (c)(1),
(2) Date: Dec. 8, 2020

(87) PCT Pub. No.: WO2020/009154
PCT Pub. Date: Jan. 9, 2020

(65) Prior Publication Data
US 2021/0251407 A1    Aug. 19, 2021

(30) Foreign Application Priority Data

Jul. 3, 2018    (JP) .............................. JP2018-127084

(51) Int. Cl.
*A47G 29/08*    (2006.01)
*F16B 45/00*    (2006.01)

(52) U.S. Cl.
CPC ............ *A47G 29/083* (2013.01); *F16B 45/00* (2013.01)

(58) Field of Classification Search
CPC ............................... A47G 29/083; F16B 45/00
See application file for complete search history.

(56) References Cited

U.S. PATENT DOCUMENTS 6,049,953 A *    4/2000    McCay ................... F16B 45/00
                                                        24/302
6,347,693 B1 *    2/2002    Chen ..................... A45C 7/0045
                                                        190/102
(Continued)

FOREIGN PATENT DOCUMENTS

CN    206507724 U    9/2017
JP    2003314528 A    11/2003
(Continued)

OTHER PUBLICATIONS

The extended European search report issued by the European Patent Office dated Apr. 28, 2021 for patent application No. 19830224.2.
(Continued)

*Primary Examiner* — Anita M King
(74) *Attorney, Agent, or Firm* — Taro Yaguchi

(57) ABSTRACT

To provide a luggage hook of improved ease of use. A luggage hook 10 that is detachably attachable to an attachment location, comprising: a base 20; a belt 81 that is attached to the attachment base 20 and wrapped around the attachment location; a primary hook member 60 comprising a cylindrical primary neck section 61 attached to the base so as to be rotatable around a central axis of rotation R, with a partially open ring-shaped primary hook body 64 being connected to the primary neck section; and a secondary hook member 70 comprising a cylindrical secondary neck section 71 rotatably fitted into the primary neck section, with a partially open ring-shaped secondary hook body 73 being connected to the secondary neck section.

10 Claims, 7 Drawing Sheets

(56) References Cited

U.S. PATENT DOCUMENTS

| | | | | |
|---|---|---|---|---|
| 2007/0095996 | A1* | 5/2007 | Selders | A45B 3/06 |
| | | | | 248/304 |
| 2012/0091294 | A1* | 4/2012 | Cuadrado | A63B 69/201 |
| | | | | 248/95 |
| 2016/0095421 | A1* | 4/2016 | Moreau | A45F 5/00 |
| | | | | 248/341 |
| 2020/0367684 | A1* | 11/2020 | Lehtonen | A45F 5/1026 |
| 2021/0106112 | A1* | 4/2021 | Lavoie | A45F 5/12 |

FOREIGN PATENT DOCUMENTS

| | | |
|---|---|---|
| JP | 2004-230060 A | 8/2004 |
| JP | 2006305286 A | 11/2006 |
| JP | 2007-268083 A | 10/2007 |
| JP | 2012-504217 A | 2/2012 |
| JP | 2016-158817 A | 9/2016 |
| WO | 2010037091 A1 | 9/2009 |
| WO | 2014030402 A | 2/2014 |
| WO | 2018-047811 A1 | 3/2018 |

OTHER PUBLICATIONS

Maiya666, "2Pcs Infant Baby Stroller Hook Holder Pram Double Rotate Hook Pushchair Hanger", eBay, Oct. 12, 2017, XP055795302, Retrieved from the Internet: URL: https://www.ebay.co.uk/itm/272337940270.

Office Action issued by CNIPA (Patent Office) for Chinese Patent Application No. 201980039377.9 dated Dec. 11, 2020.

\* cited by examiner

HOOK OF LUGGAGE HANGER

FIELD OF THE INVENTION

The present invention relates to a luggage hook that attaches to a stroller or shopping cart and on which baggage such as bags, shopping bags, and the like can be hung, and, in particular, to a luggage hook of improved ease of use.

BACKGROUND OF THE INVENTION

When using a stroller or shopping cart, one may hang bags, shopping bags, or the like from the handlebar thereof. In such cases, it is convenient to be able to attach a detachable luggage hook thereto, and suspend bags from the luggage hook. For this reason, various types of luggage hooks have been proposed.

Luggage hooks of this sort are constituted by a combination of an attaching part that fastens onto a handlebar, and a hook part, attached to the attaching part, that has a letter-S shape either overall or in its lower half. The hook part is swingably attached to the attaching part, and is capable of suspending a bag in the desired direction (for example, see Patent Document 2). However, only one item of baggage can be hung on one hook part, thus necessitating additional luggage hooks if there are multiple items of baggage. Moreover, if the hook part is fixed in place, the direction from which baggage is hung becomes fixed; thus, hooks that are capable of rotating around the vertical axis have been proposed (for example, see Patent Document 1).

However, depending on the position of the center of gravity of the item of baggage, the hook part may rotate around the axis of rotation, resulting in a problematic lack of baggage stability. There also exists a type that uses hook-and-loop fasteners to fasten to the handlebar (for example, see Patent Document 3). However, while such hooks have a simple structure, the user must check the front and rear of the hook-and-loop fasteners every time the fasteners are wrapped around, which makes the hooks hard to handle when there are numerous items of baggage or the user is in a hurry.

PRIOR ART DOCUMENT

Patent Document

[Patent Document 1] JP 2003-314528 A (paragraph [0023], FIGS. 5 and 7)
[Patent Document 2] WO/2014/030402 A1 (paragraph [0007], FIG. 35)
[Patent Document 3] JP 2006-305286 A (paragraph [0019], FIG. 3-5)

SUMMARY OF THE INVENTION

Problem to be Solved by the Invention

While various types of luggage hooks of this sort have been developed hitherto, they have had the problem of being inconvenient and difficult to use.

The present invention was conceived in view of the problems in the prior art described above, and has an object of providing a luggage hook that allows for improved ease of use.

Means for Solving the Problem

In order to achieve the object proposed above, the present invention provides a luggage hook for detachably attaching to an attachment location, the hook comprising: a base (20); a belt attached to the base (20) for wrapping around the attachment location; a primary hook member (60) comprising a cylindrical primary neck section (61) attached at a proximal end thereof to the base (20), and an upward-opening primary hook body (64) that is attached to the lower end of the primary neck (61); and a secondary hook member (70) comprising a secondary neck section (72) attached to the primary neck section (61), and an upward-opening secondary hook body (73) that is attached to the secondary neck section; the primary hook body (64) and the secondary hook body (73) being configured so that one or both thereof rotate relative to the base (20), provided so that the positions thereof in the vertical direction partially overlap, but do not interfere with each other even when one or both are rotated relative to the base (20), and configured so that, when the rotational-direction positions thereof are aligned with each other, the secondary hook body (73) narrows and blocks an open part (65) of the primary hook body (64).

Effects of the Invention

In accordance with the present invention, it is possible to improve ease of use.

DETAILED DESCRIPTION OF THE INVENTION

Figure 1:
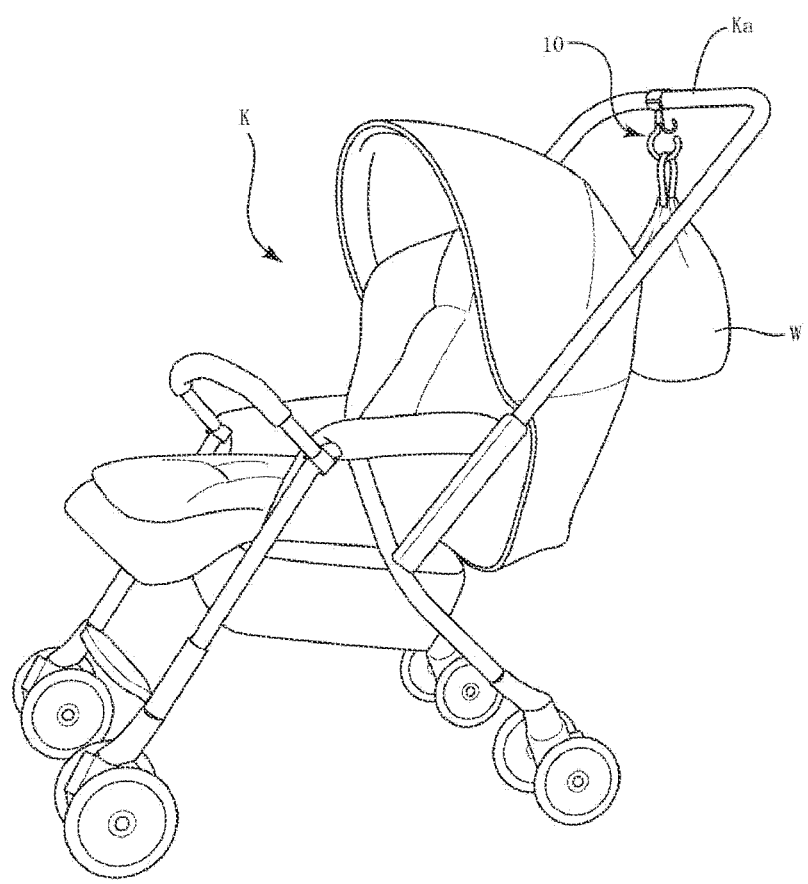
FIG. 1 A perspective view of a stroller to which a luggage hook according to an embodiment of the present invention has been attached.
Figure 2:
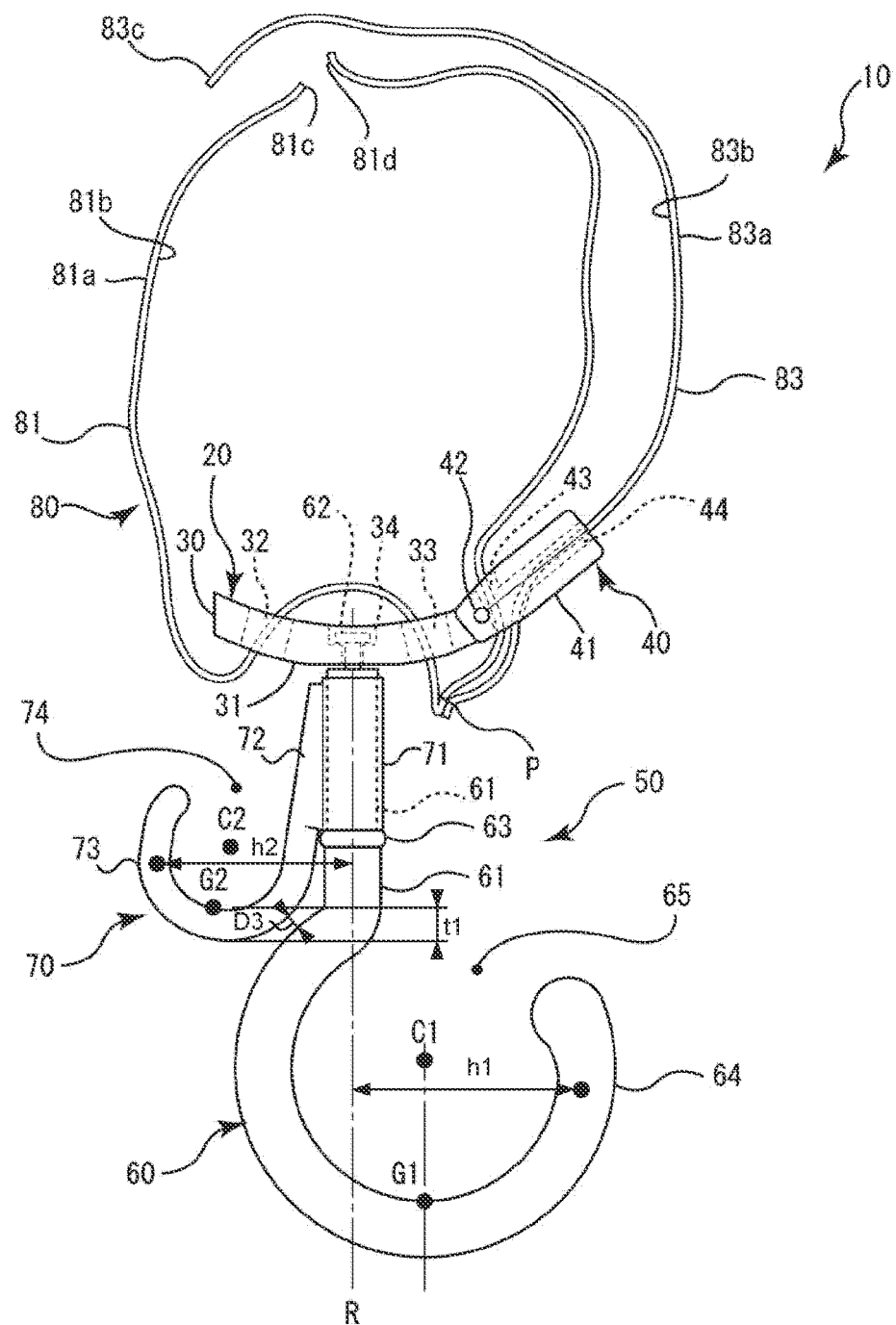
FIG. 2 A plan view of the luggage hook of FIG. 1.
Figure 3:
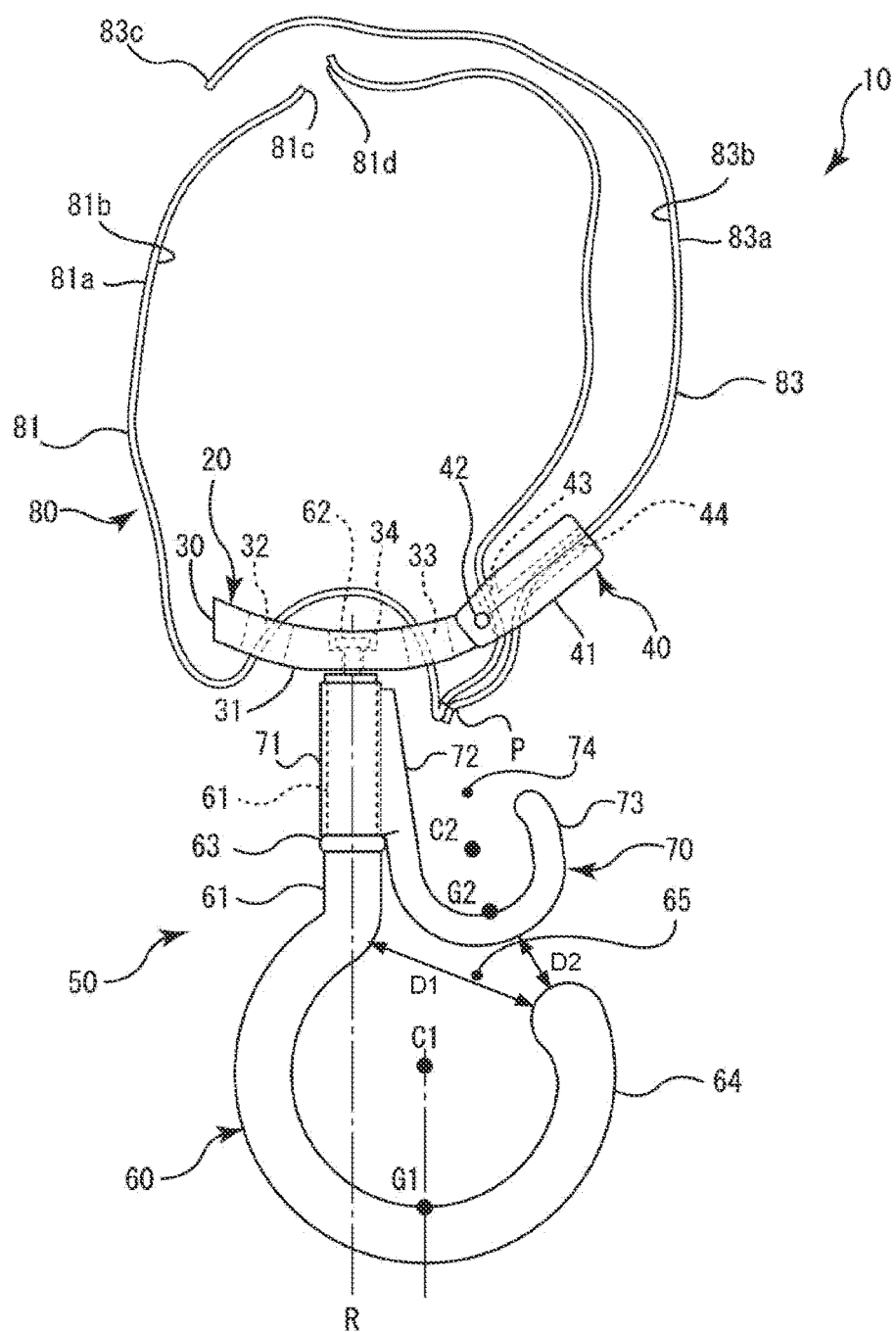
FIG. 3 A plan view of the luggage hook of FIG. 1.
Figure 4:
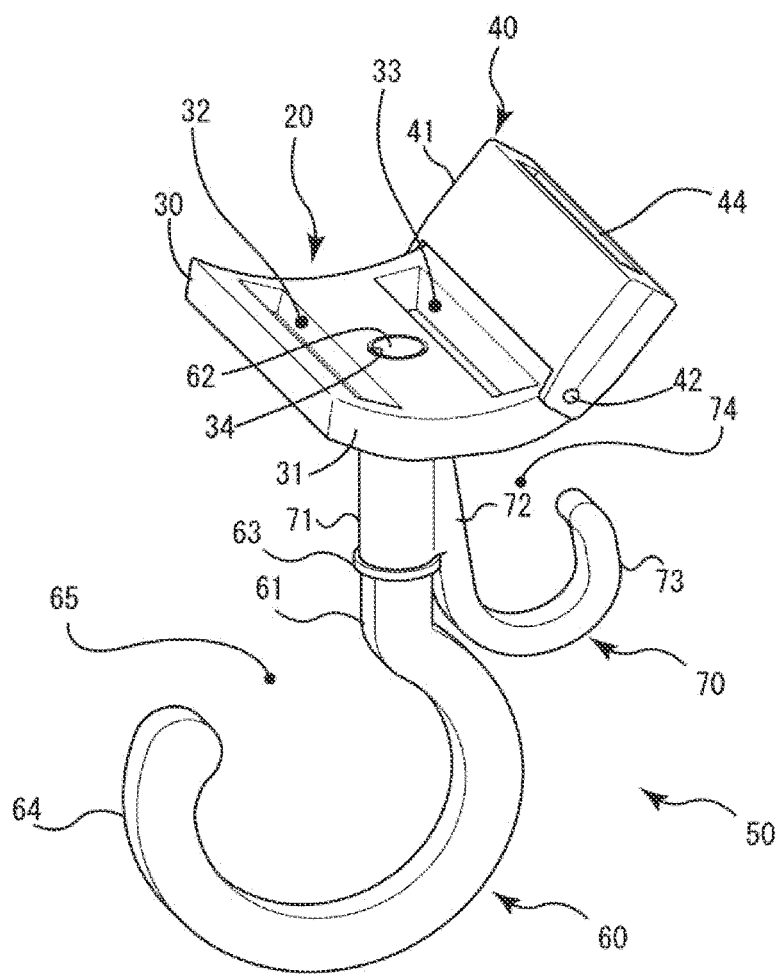
FIG. 4 A perspective view of an attachment base and hook unit of the luggage hook in FIG. 2.
Figure 5:
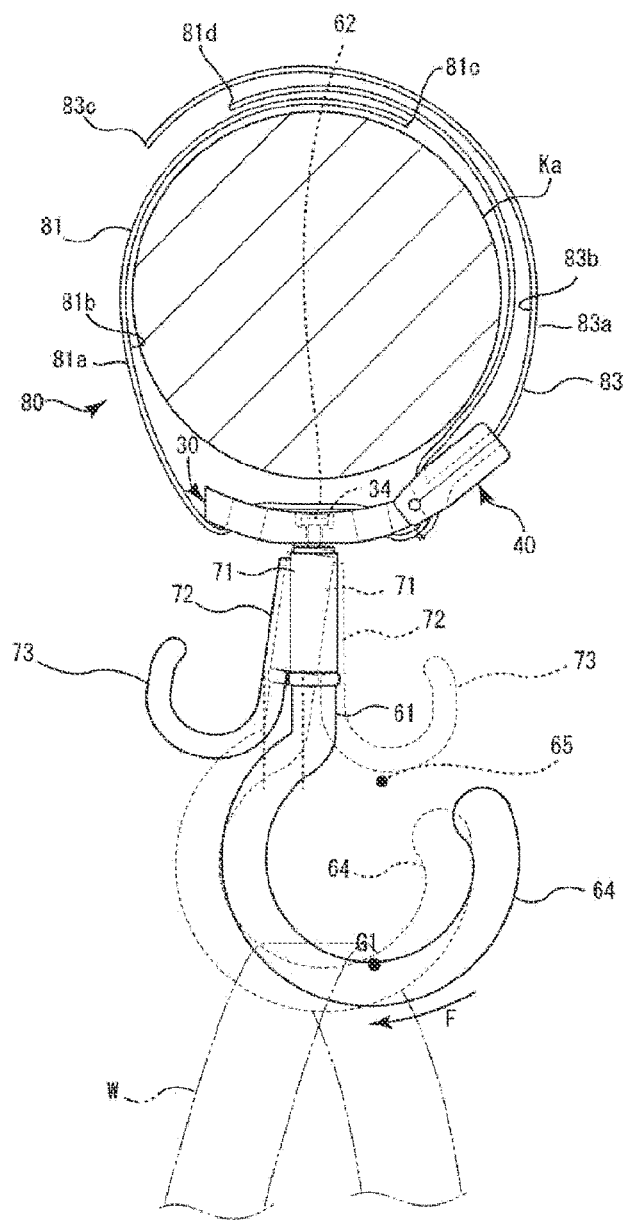
FIG. 5 A supplementary illustration for explaining a method of using the luggage hook of FIG. 2.

FIG. 1 is a perspective view of a stroller K to which a luggage hook 10 according to an embodiment of the present invention is attached, FIGS. 2 and 3 are plan views of the luggage hook 10, FIG. 4 is a perspective view of a base body 30 and a hook unit 50 of the luggage hook 10, and FIG. 5 is a supplementary illustration for explaining a method of using the luggage hook 10. In the drawings, W indicates an item of baggage, such as a bag or shopping bag. FIG. 2 depicts a state in which a secondary hook body 73 faces the same direction as the primary hook body 64, and FIG. 4 depicts a state in which the secondary hook body 73 faces the opposite direction as the primary hook body 64.

As shown in FIG. 1, the luggage hook 10 is detachably attached to a handlebar (attachment location) Ka of the stroller K. As shown in FIGS. 2 and 3, the luggage hook 10 comprises: an attachment base 20 disposed facing the handlebar Ka; a hook unit 50 provided so as to be rotatable around an axis of rotation R with respect to the attachment base 20; a belt 81 that is attached to the attachment base 20 and wrapped around the handlebar Ka; and a reinforcing belt 83 for reinforcing joined parts of the belt 81 wrapped around the handlebar Ka.

The attachment base 20 comprises a plate-shaped base body 30, and a swiveling base 40 swivelably attached to the base body 30. The base body 30 comprises a plate-shaped plate member 31. A first hole 32 and a second hole 33 through which the belt 81 is passed, as described hereinafter, and a through-hole 34 through which a connecting pin 62 is passed, as described hereinafter, are formed in the plate member 31.

The swiveling base 40 comprises a plate member 41. The plate member 41 is swivelably attached at its proximal end to the plate member 31 by a rod-shaped swivel pin 42.

A first hole 43 through which the belt 81 described below is passed, the hole being in the through-thickness direction of the plate member 41, and a lateral hole 44 that communicates with the first hole 43 and opens on a distal end side of the plate member 41 in the lengthwise direction thereof, and through which the reinforcing belt 83 described hereinafter is passed, are formed in the plate member 41.

The hook unit 50 comprises a primary hook member 60 and a secondary hook member 70. The primary hook member 60 comprises a cylindrical primary neck section 61 and a partially open ring-shaped primary hook body 64 connected to the lower end of the primary neck section 61. A pin hole is formed in the upper end surface of the primary neck section 61. With the pin hole aligned with the through-hole 34 in the base body 30, the primary hook member 60 is substantially vertically and rotatably mounted in the base body 30 using the connecting pin 62. The centerline of the primary neck section 61 constitutes a central axis of rotation R.

The connecting pin 62 and the through-hole 34 are formed so that there is a slight gap between the outer diameter of the former and the inner diameter of the latter. As a result, the entire primary hook member 60 can be manually rotated around the central axis R with respect to the base body 30. It is preferable that a certain amount of torque be necessary to rotate the primary hook member 60. For example, the fit between the connecting pin 62 and the through-hole 34 can be a transition fit, or the tightening force of the connecting pin 62 can be adjusted to manifest such an amount of resistance. In this embodiment, the torque needed to rotate the primary hook member 60 is 5-40 cN·m, more preferably 10-35 cN·m, more preferably 15-30 cN·m, more preferably 20-25 cN·m. In this case, as seen in FIG. 2, the distance h1 from the central axis R to the point of effort of the primary hook member 60 is 4 cm, and the torque is 24 cN·m in this example.

In this embodiment, the primary neck section 61 and the primary hook body 64 form a single whole, and the primary neck section is rotatably attached to the base body 30; however, it is also possible for the primary neck section and the base body 30 to form a single whole, and the primary hook body and a primary neck member to be rotatably attached to each other.

An outwardly jutting flange 63 is formed on the circumferential surface of the primary neck section 61. The flange 63 has the function of supporting the secondary hook member 70 described above. An open part 65 of the primary hook body 64 is formed facing somewhat upward to keep the item of baggage W from falling off. A position C1 of the center of the ring of the primary hook body 64 is somewhat displaced from the central axis of rotation R toward the open part 65.

The secondary hook member 70 comprises a cylindrical secondary neck section 71. The inner diameter of the secondary neck section 71 is equal to or slightly greater than the outer diameter of the primary neck section 61. As a result, the secondary neck section 71 rotatably fits into the primary neck section 61. Here as well, it is preferable that a certain amount of torque be necessary to rotating the secondary neck member 70; in this embodiment, 5-40 cN·m, more preferably 10-35 cN·m, more preferably 15-30 cN·m, more preferably 20-25 cN·m. In this case, as seen in FIG. 2, the distance h2 from the central axis R to the point of effort of the primary hook member 60 is 3.5 cm, and the torque is 20 cN·m in this example.

The secondary neck section 71 comprises a bracket 72 protruding from the circumferential surface thereof. A partially open, ring-shaped secondary hook body 73 is connected to the bracket 72. An open part 74 of the secondary hook body 73 is formed facing somewhat upward to keep the item of baggage W from falling off. A position C2 of the center of the ring of the secondary hook body 73 is displaced away from the central axis of rotation R.

The primary neck section 61 of the primary hook member 60 and the secondary neck section 71 of the secondary hook member 70 are both rotatable around the central axis of rotation R.

For this reason, when the primary hook body 64 and the secondary hook body 73 are facing different directions, the secondary hook body 73 is away from the open part 65 of the primary hook body 64 (see solid lines in FIG. 5). The secondary hook body 73 is smaller than the primary hook body 64 and has a shape that partially overlaps the upper part of the primary hook body 64 (with the overlap being indicated by μl in FIG. 2) so that, when the primary hook body 64 and the secondary hook body 73 are facing the same direction—i.e., when the primary hook body 64 and the secondary hook body 73 are aligned—the secondary hook body 73 narrows and blocks the open part 65 of the primary hook body 64 (see dotted lines in FIG. 5). Specifically, the height from the upper end of the secondary hook member 70 to the lower end thereof is substantially equal to or slightly greater than the height of the primary neck section 61.

The narrowed dimension D2 of the open part 65 of the primary hook body 64 yielded by the secondary hook body 73 when the primary hook body 64 and the secondary hook body 73 are facing in the same direction is preferably to be 50% or less of the original opening dimension D1, preferably 25% or less, more preferably 10% or less; this embodiment is designed so that the original open dimension is 2 cm, and the open dimension when narrowed and blocked is 4 mm.

In this embodiment, a continuous straight line section from the bracket 72 to the secondary hook body 73 is oblique with respect to the central axis of rotation R. In other words, a straight line passing through a lowest point G2 of the secondary hook body 73 and the ring center C2 of the secondary hook body 73 is oblique with respect to the central axis of rotation R. As a result, the secondary hook body 73 does not interfere with the primary hook member 60 when the secondary hook body 73 rotates (see dimension D3 in FIG. 2).

The belt 81, along with the reinforcing belt 83, forms a belt unit 80. The belt 81 has sufficient overall length to be wrapped around the handlebar Ka. At a join P of the belt 81, one end of the reinforcing belt 83 is sewn and joined to the surface of the belt 81. The sewing of the reinforcing belt 83 to the surface of the belt 81 at the join P increases thickness at the joined parts, thus keeping the belt 81 from coming out of the second hole 33 and making it possible to keep the belt unit 80 from coming off the attachment base 20.

A loop surface of a hook-and-loop fastener is formed over the entirety of a front surface 81a of the belt 81, and a hook surface of a hook-and-loop fastener is formed over the entirety of a rear surface 81b thereof. In the drawings, 81c indicates one end of the belt 81, and 81d indicates the other end thereof. The hook and loop surfaces of the hook-and-loop fastener bond with a certain degree of bond force when pressed together, and require a certain degree of strong force to be peeled apart.

Nothing is formed on a front surface 83a of the reinforcing belt 83, and a hook surface of a hook-and-loop fastener is formed on a distal end 83c side of a rear surface 83b thereof. In the drawings, 83c indicates the distal end of the reinforcing belt 83. The reinforcing belt 83 is formed so that the length thereof is greater than the length from the join P to the other end 81d of the belt 81.

Figure 6:
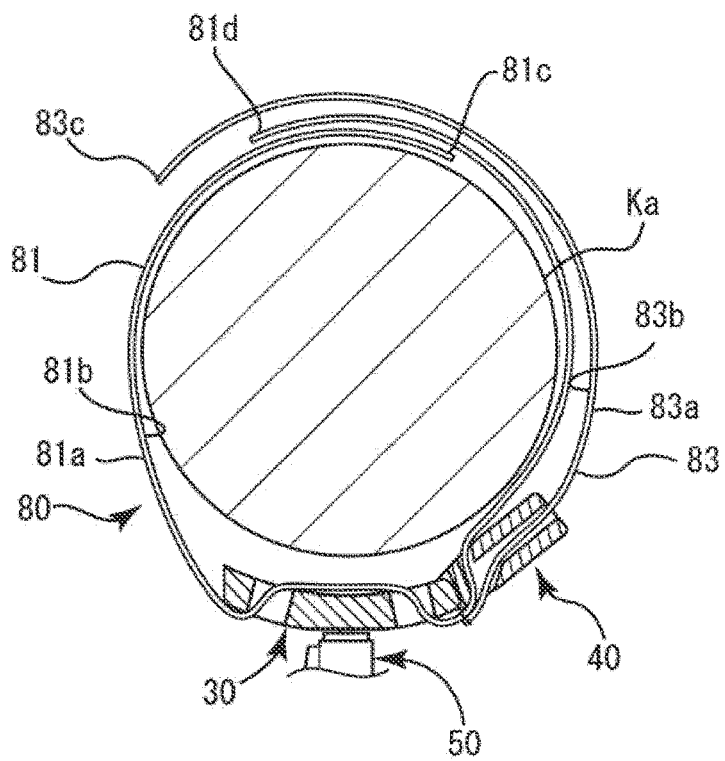
FIG. 6 A plan view of an example of a method of wrapping a belt unit of the luggage hook of FIG. 2.

The luggage hook 10 thus configured is used, for example, as shown in FIG. 6. First, the luggage hook 10 is secured to the handlebar Ka of the stroller K. To secure the hook, the attachment base 20 is brought near the handlebar Ka and the one end 81c of the belt 81 is wrapped around the handlebar Ka. The other end 81d of the belt 81 is wrapped over the one end 81c of the belt 81 wrapped around the handlebar Ka. At this time, the hook surface on the rear surface 81b of the other end 81d of the belt 81 engages with and joins to the loop surface on the front surface 81a on the one end 81c of the belt 81. The reinforcing belt 83 is then wrapped thereover around the handlebar Ka to cause the hook surface on the rear surface 83b of the reinforcing belt 83 to engage with and join at the distal end 83c to the loop surface on the front surface 81a of the other end 81d of the belt 81.

In other words, the front surface 81a and the rear surface 81b of the belt 81 join, the front surface 81a of the belt 81 and the rear surface 83b of the reinforcing belt 83 join, and the entirety of the belt unit 80 is wrapped around the handlebar Ka and secured. FIG. 6 is a schematic illustration of this state.

Figure 7:
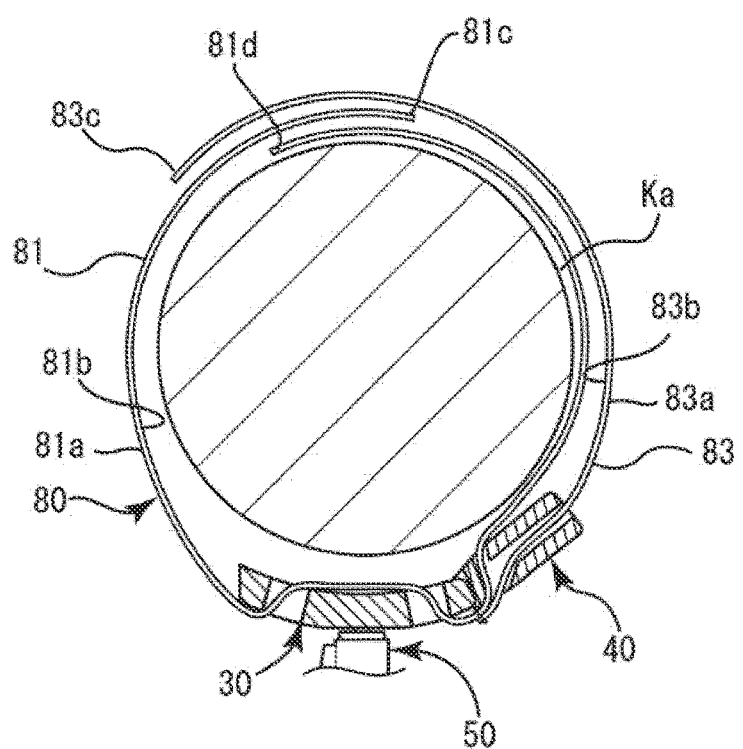
FIG. 7 A plan view of another example of a method of wrapping a belt unit of the luggage hook of FIG. 2.

An example in which the one end 81c side of the belt 81 is wrapped around the handlebar Ka first has been described with reference to FIG. 6; however, it is also possible to wrap the other end 81d of the belt 81 around the handlebar Ka first. To secure the hook, the attachment base 20 is brought near the handlebar Ka and the other end 81d of the belt 81 is wrapped around the handlebar Ka, as shown in FIG. 7. The one end 81c of the belt 81 is wrapped over the other end 81d of the belt 81 wrapped around the handlebar Ka. At this time, the hook surface on the rear surface 81b of the one end 81c of the belt 81 engages with and joins to the loop surface on the front surface 81a on the other end 81d of the belt 81. The reinforcing belt 83 is then wrapped thereover around the handlebar Ka to cause the hook surface on the rear surface 83b of the reinforcing belt 83 to engage with and join at the distal end 83c to the loop surface on the front surface 81a of the one end 81c of the belt 81.

Next, an item of baggage W is hung on the primary hook body 64 of the primary hook member 60 at the position indicated by the solid lines in FIG. 5. The load of the baggage W is placed upon the lowest point G1 of the primary hook body 64. As shown in FIGS. 2 and 3, the lowest point G1 is positioned on a vertical axis passing through the ring center C1. Thus, there is an offset between the lowest point G1 and the central axis of rotation R, with the result that the primary hook body 64 swivels in the direction indicated by F in FIG. 5 to the position indicated by dotted lines in FIG. 5. At this time, the connecting pin 62 tilts within the through-hole 34. Because there is only a slight gap between the outer diameter of the connecting pin 62 and the inner diameter of the through-hole 34, the connecting pin 62 catches on the inner wall of the through-hole 34, thereby restricting the free rotation of the connecting pin 62. Accordingly, the primary neck section 61 of the primary hook body 64 on which the baggage W is hung does not rotate, and remains stable.

Meanwhile, the secondary neck section 71 rotatably attached to the primary neck section 61 is rotated by the weight of the bracket 72 and the secondary hook body 73 to the position indicated by dotted lines in FIG. 5. In other words, the primary hook body 64 and the secondary hook body 73 remain stably facing the same direction. At this time, the open part 65 of the primary hook body 64 is narrowed and blocked by the secondary hook body 73, thereby making it possible to keep the baggage W from falling out of the open part 65. The rotational position of the secondary hook body 73 also stabilizes, thus eliminating the need for a user to alter the direction of the secondary hook body 73 in order to hang another item of baggage, and increasing ease of use.

Because hook-and-loop fasteners are formed on the front and rear surfaces of the belt 81 of the luggage hook 10 thus configured, either side of the belt 81 may be wrapped around the handlebar Ka first when wrapping the belt 81 around the handlebar Ka. Accordingly, a user can secure the hook without having to pay attention to direction. In addition, further wrapping the reinforcing belt 83 over the belt makes it possible to increase the area of the site bonded by the hook-and-loop fasteners, thus allowing the hook to be more stably secured, and improving ease of use.

In addition, hanging the baggage W on the primary hook body 64 of the primary hook member 60 causes the primary hook body 64 to tilt, thus restricting the rotation of the primary neck section 61 enabling stabilization. In this case, the secondary hook body 73 of the secondary hook member 70 blocks the open part 65 of the primary hook body 64, making it possible to further keep the baggage W from falling off. In addition, another item of baggage can be hung on the secondary hook body 73, thereby improving ease of use.

While one embodiment of the present invention has been described above, the present invention is not limited to the embodiment described above, and various modifications as will not depart from the spirit of the invention may be made thereto in practice.

For example, while the primary hook body 64 and secondary hook body 73 had the shape of partially open rings in the embodiment described above, the shape of the hooks is not limited thereto. For example, the hooks may have partially open polygonal shapes, such as triangular or quadrangular, or partially open elliptical shapes.

Figure 8:
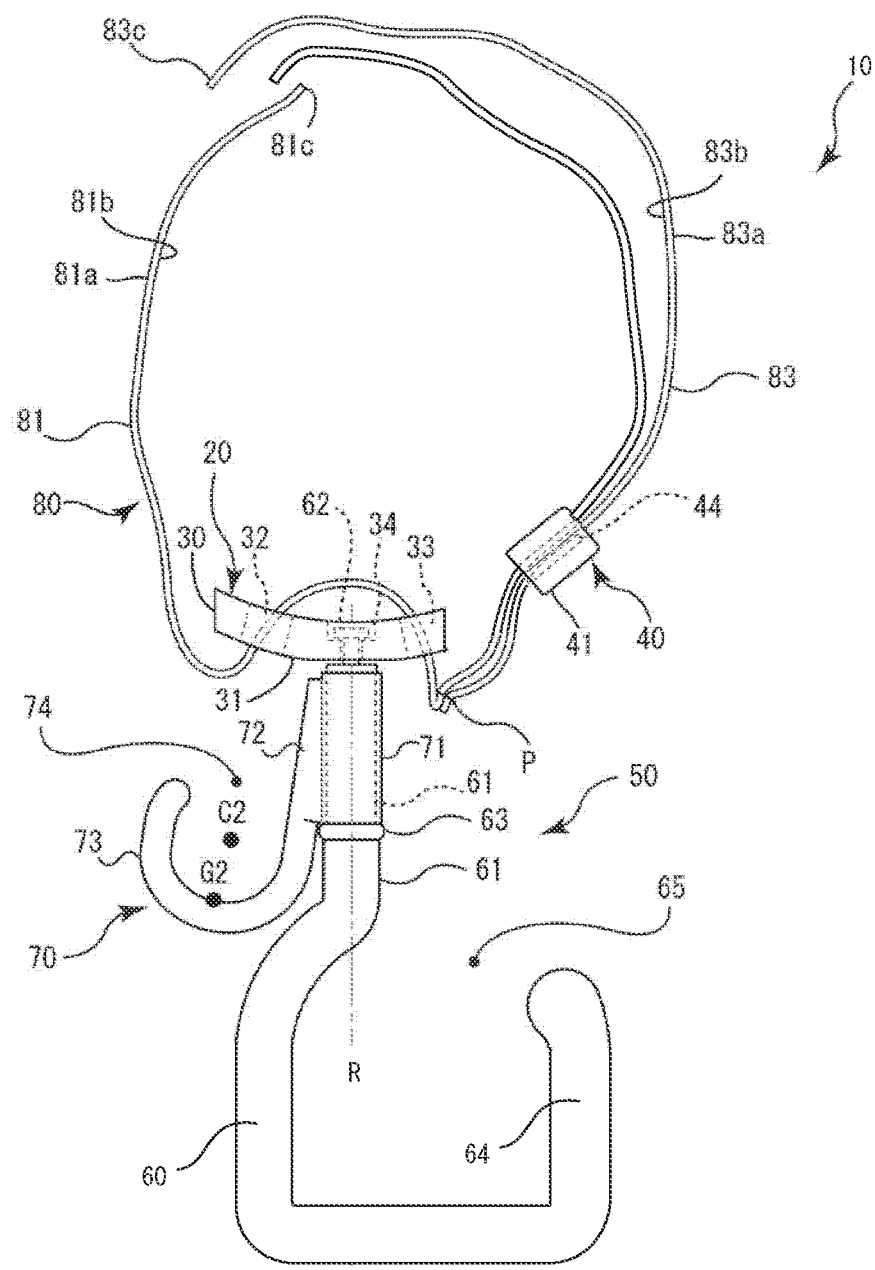
FIG. 8 A plan view of a luggage hook according to another embodiment of the present invention.

Alternatively, the hook body 64 may be channel-shaped, as shown in FIG. 8.

Moreover, while the swiveling base 40 was linked to the attachment base 20 by a pin 42 in the foregoing embodiment, the two need not be linked together, as shown in FIG. 8.

DESCRIPTION OF THE REFERENCE NUMBERS

10 . . . luggage hook, 20 . . . attachment base, 30 . . . base body, 31 . . . plate member, 32 . . . first hole, 33 . . . second hole, 34 . . . through-hole, 40 . . . swiveling base, 41 . . . plate member, 42 . . . swivel pin, 43 . . . first hole, 44 . . . lateral hole, 50 . . . hook unit, 60 . . . primary hook member, 61 . . . primary neck section, 62 . . . connecting pin, 63 . . . flange, 64 . . . primary hook body, 65 . . . open part, 70 . . . secondary hook member, 71 . . . secondary neck section, 72 . . . bracket, 73 . . . secondary hook body, 74 . . . open part, 80 . . . belt unit, 81 . . . belt, 81*a* . . . front surface, 81*b* rear surface, 81*c* . . . one end, 81*d* . . . other end, 83 . . . reinforcing belt, 83*a* . . . front surface, 83*b* . . . rear surface, 83*c* . . . distal end.

I claim:

1. A luggage hook for detachably attaching to an attachment location, comprising:
   a base (20);
   a belt attached to the base (20) for wrapping around the attachment location;
   a primary hook member (60) comprising a cylindrical primary neck section (61) attached at a proximal end thereof to the base (20), and an upward-opening primary hook body (64) attached to a lower end of the primary neck section (61); and
   a secondary hook member (70) comprising a secondary neck section (71) attached to the primary neck section (61), and an upward-opening secondary hook body (73) attached to the secondary neck section;
   the primary hook body (64) and the secondary hook body (73)
   being configured so that one or both thereof rotate relative to the base (20),
   being provided so that positions thereof in a vertical direction partially overlap, but so as not to interfere with each other even when one or both thereof are rotated relative to the base (20), and
   being configured so that, when rotational-direction positions thereof are aligned, the secondary hook body (73) narrows and blocks an open part (65) of the primary hook body (64).

2. The luggage hook according to claim 1, wherein:
   when the rotational-direction positions thereof are aligned, the secondary hook body (73) narrows and blocks the open part (65) of the primary hook body (64) by 50% or more.

3. The luggage hook according to claim 2, wherein:
   when the rotational-direction positions thereof are aligned, the secondary hook body (73) narrows and blocks the open part (65) of the primary hook body (64) by 75% or more.

4. The luggage hook according to claim 1, wherein:
   the secondary hook body is formed so as to have a smaller outer shape that the primary hook body.

5. The luggage hook according to claim 1, wherein:
   the center of the primary hook body is displaced from a central axis of rotation toward the open part of the primary hook body; and
   the center of the secondary hook body is displaced from the central axis of rotation toward an open part of the secondary hook body.

6. The luggage hook according to claim 1, wherein:
   the primary hook body has an upward-opening substantially letter-C shape that protrudes in different directions with the rotation axis in between; and
   the secondary hook body has an upward-opening letter-J shape that protrudes to only one side of the axis of rotation.

7. The luggage hook according to claim 1, wherein:
   a torque necessary to rotate the primary hook body relative to the base is 5-40 cN·m.

8. The luggage hook according to claim 7, wherein:
   a torque necessary to rotate the secondary hook body relative to the primary hook body is 5-40 cN·m.

9. The luggage hook according to claim 1, wherein the belt has a hook surface of a hook-and-loop fastener formed on an entirety of one side thereof, and a loop surface of the hook-and-loop fastener formed on an entirety of the other side thereof.

10. The luggage hook according to claim 1, further comprises a reinforcing belt for reinforcing joined parts of the belt wrapped around the attachment location; and
    wherein the reinforcing belt is connected at one end to an outer surface of the belt, and is longer than a length from a connecting part of the reinforcing belt to one end of the belt.

* * * * *